April 10, 1962  A. J. HIRST  3,028,665
METHOD OF MAKING A RESILIENT MOUNTING
Filed Nov. 3, 1958
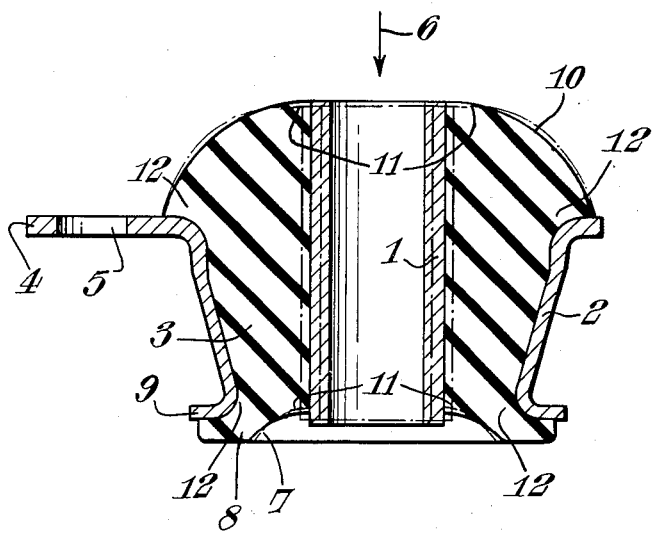
Inventor
Archie J. Hirst
By Ralph B. Stewart
Attorney

United States Patent Office 3,028,665
Patented Apr. 10, 1962

3,028,665
METHOD OF MAKING A RESILIENT MOUNTING
Archie John Hirst, Leicester, England, assignor to Metalastik Limited, Leicester, England, a British company
Filed Nov. 3, 1958, Ser. No. 771,338
Claims priority, application Great Britain Nov. 12, 1957
2 Claims. (Cl. 29—450)

This invention concerns resilient mountings comprising a substantially frusto-conical outer metal sleeve, a concentric cylindrical inner sleeve which projects from the larger frusto-conical end of the frusto-conical sleeve and a bush of rubber-like material between and bonded to the sleeves, the bush also projecting from the larger end of the frusto-conical sleeve. Such a mounting is hereinafter called a mounting of the type set forth.

It is known that when a rubber bush is bonded to inner and outer sleeves, after the bonding process the rubber is in tension and in certain operating conditions such a resilient mounting has a relatively short fatigue life. To extend the fatigue life of the rubber bush it is necessary to eliminate the shrinkage tension, and preferably to compress the bush so that under all operating conditions the rubber remains in compression.

In a mounting of the type set forth it has been found that the rubber is liable to fatigue failure around the inner sleeve at the end of the mounting of smaller diameter and it would be expected therefore, that compression of the rubber only in the region where the failure occurs would extend the fatigue life. In fact this is found not to be so.

The object of this invention is to provide a resilient mounting of the type set forth wherein the fatigue life, compared with known constructions, is considerably extended. To achieve this extension of the fatigue life, the mounting is assembled and the bush is bonded to the inner and outer sleeves, with the inner sleeve in the required axial position relative to the outer sleeve, and thereafter the inner sleeve is radially expanded uniformly and substantially over its entire length to increase its bore and reduce its axial length there to eliminate in the bush at the smaller end of the bush shrinkage tension due to the bonding. Preferably the inner sleeve is sufficiently expanded also to precompress the bush. Under test a mounting having its bush precompressed in accordance with the present invention was vibrated until the mounting failed and similar mountings (wherein, however, either the inner sleeve was expanded for only a relatively short axial distance at the end of the mounting of smaller diameter or was not expanded at all) were subjected to identical tests and it was found that mountings made in accordance with the present invention require, in one instance, 70 hours to initial failure and in another instance no failure occurred after a test of 200 hours duration. In yet another test of 87 hours duration no failure occurred. This compares with tests on those resilient mountings referred to which were not in accordance with the present invention wherein initial failure occurred within 15 to 35 hours, failure occurring in each case. It will be evident therefore that by uniformly radially expanding the inner sleeve over its entire length, or substantially over its entire length, after the bonding operation to precompress the bush a very considerable increase in the fatigue life of the resilient mounting is obtained, this being at least twice as long as the best fatigue life, up to initial failure, obtained for other mountings.

According to a feature of the present invention the inner sleve is radially expanded by a drift passed therethrough in the direction of convergence of the outer sleeve.

A practical application of the present invention will now be described, by way of example only, with reference to the accompanying drawing which shows, in sectional elevation, a mounting according to the present invention.

Referring to the drawing: the mounting comprises a cylindrical inner metal sleeve 1, a substantially frusto-conical outer metal sleeve 2 within which the inner sleeve is concentrically disposed and a bush 3 of rubber-like material between the sleeves. The bush is bonded or similarly united to the inner and outer sleeves 1 and 2 respectively both the bush 3 and the inner sleeve 1 projecting from the larger end of the frusto-conical outer sleeve 2.

The outer sleeve 2 is formed with a flange 4 by which the mounting is secured to a base plate or similar part by bolts (not shown) passing through holes 5 in the flange 4. The part to be supported is secured, as by a bolt passing through the inner sleeve 1 so that the load of the supported part is applied to the mounting in the direction of the arrow 6.

The under-surface of the rubber bush 3 is dished, as at 7, and the bush is extended outwardly (as at 8) beneath a flange 9 of the sleeve 2, the outward extension 8 constituting a buffer member which resiliently limits the extent of upward movement permitted to the supported part by the mounting. The upper part 10 of the rubber bush 3 is convex and overlies flange 4 to constitute a resilient buffer.

During the process of bonding the rubber bush 3 to the inner and outer sleeves the rubber bush shrinks and is in tension after the process. With a view to eliminating the tension in the rubber bush and with a view to subjecting the bush to pre-compression (i.e. so that in its unloaded state the rubber bush is in radial compression) the inner sleeve is radially expanded uniformly over the greater part of its length and, preferably, over its entire length so as to cause a reduction in the axial length of the inner sleeve without displacing the inner sleeve axially relative to the outer sleeve. The expansion is performed by a conical tool or drift which is introduced in the direction of the arrow 6, that is, the drift is forced through the sleeve 1 in the direction of convergence of the outer sleeve 2. The increase in bore diameter of the inner sleeve may be from 20 to 40% but is preferably between 30 and 35%.

It has been found that when the inner sleeve is radially expanded substantially over its length to a degree such that the tension in the rubber bush due to the bonding process is eliminated and thereafter the bush 3 is pre-compressed by reducing the radial distance between the sleeves by between 10 and 15%, the fatigue life of the bush is materially extended. To obtain this desirable result it is necessary that the inner sleeve be radially expanded substantially over its entire length so as to cause a reduction in its axial length whereby the portions 11 of the ends of the rubber bush which are in the immediate vicinity of the sleeve 1 will move towards each other upon expansion of the inner sleeve. This effect will be appreciated from the drawing wherein the sleeve 1 is shown in the full line position prior to radial expansion and in the chain dotted position after radial expansion.

Since the inner sleeve is foreshortened, and the bush is bonded to the inner sleeve the bush also is foreshortened adjacent the inner sleeve.

I claim:

1. A method of making a resilient mounting of the type having a substantially frusto-conical outer metal sleeve, and a concentric cylindrical inner sleeve projecting from the larger end of the frusto-conical sleeve, and a bush of rubber-like material positioned between and bonded to the sleeves, the bush also projecting from the larger end of the frusto-conical sleeve, said method comprising the steps of:
 (a) bonding the inner sleeve within the bush;
 (b) bonding the bush within the outer sleeve with the inner sleeve in its required axial position relative to the outer sleeve;
 (c) radially expanding the inner sleeve uniformly substantially over its length; and
 (d) reducing the axial length of the inner sleeve;
whereby the bush is radially compressed and axially foreshortened sufficiently to eliminate in at least the smaller end of the bush, shrinkage tension due to bonding.

2. The method recited in claim 1 wherein the inner sleeve is radially expanded to increase its bore from between 20% to 40%.

References Cited in the file of this patent

UNITED STATES PATENTS

| | | |
|---|---|---|
| 1,888,642 | Tryon | Nov. 22, 1932 |
| 2,720,374 | Hutton | Oct. 11, 1955 |

FOREIGN PATENTS

| | | |
|---|---|---|
| 680,434 | France | Jan. 18, 1930 |
| 690,443 | Great Britain | Apr. 22, 1953 |